(12) United States Patent
Tanida et al.

(10) Patent No.: US 8,030,582 B2
(45) Date of Patent: Oct. 4, 2011

(54) BOTTOMING DETECTION WEIGHING SCALE AND METHOD OF CONTROLLING WEIGHING SCALE

(75) Inventors: Senri Tanida, Itabashi-ku (JP); Kotaku Kobayashi, Shiki (JP)

(73) Assignee: Tanita Corporation, Itabashi-Ku, Tokyo (JP)

( * ) Notice: Subject to any disclaimer, the term of this patent is extended or adjusted under 35 U.S.C. 154(b) by 301 days.

(21) Appl. No.: 12/483,042

(22) Filed: Jun. 11, 2009

(65) Prior Publication Data
US 2010/0012393 A1   Jan. 21, 2010

(30) Foreign Application Priority Data
Jul. 15, 2008   (JP) .................... 2008-184242

(51) Int. Cl.
G01G 19/44   (2006.01)
(52) U.S. Cl. .......... 177/1; 177/25.13; 177/244; 702/101
(58) Field of Classification Search ............. 177/1, 25.11–25.19, 244; 702/101, 702/102, 173, 174
See application file for complete search history.

(56) References Cited

U.S. PATENT DOCUMENTS

| | | | |
|---|---|---|---|
| 2,914,310 A | 11/1959 | Bahrs | |
| 3,999,621 A | 12/1976 | Wagner | |
| 4,326,596 A * | 4/1982 | Beck | 177/178 |
| 4,493,220 A | 1/1985 | Carignan et al. | |
| 5,994,649 A | 11/1999 | Garfinkle et al. | |
| 6,721,980 B1 | 4/2004 | Price et al. | |
| 6,838,624 B2 * | 1/2005 | Chan | 177/50 |
| 7,790,992 B1 * | 9/2010 | Abbruscato | 177/244 |

FOREIGN PATENT DOCUMENTS
JP   08-247832 A   9/1996

OTHER PUBLICATIONS

Extended European Search Report issued Sep. 16, 2009 by European Patent Office in corresponding European Application No. 09 16 2109.

* cited by examiner

*Primary Examiner* — Randy W Gibson
(74) *Attorney, Agent, or Firm* — Buchanan Ingersoll & Rooney PC

(57) ABSTRACT

A body weighing machine (100) is provided with a distance measuring sensor (30) at the central position (C) of a base plate unit (50). A CPU (10) measures the body weight of a human subject. The CPU (10) then drives the distance measuring sensor (30) to measure a distance (Dm) between the sensor and a floor surface and determines whether a minimum distance (D) between the base plate unit (50) and the floor surface is zero. The CPU (10) displays via a display unit (15) a message indicating that an error has occurred in a case in which the minimum distance (D) is zero, and otherwise displays the measured body weight on the display unit (15).

11 Claims, 10 Drawing Sheets

BOTTOMING DETECTION WEIGHING SCALE AND METHOD OF CONTROLLING WEIGHING SCALE

BACKGROUND OF THE INVENTION

1. Field of the Invention

The present invention relates to a weighing scale capable of detecting bottoming that hinders the accurate measurement of a weight, and also to a method of controlling a weighing scale.

2. Description of Related Art

There is a type of error state that can occur when using a scale for weighing, which is called "bottoming" (i.e., "reaching the bottom" or "bottoming out"). The bottoming refers to a phenomenon in which the bottom portion of a base plate unit of a weighing scale touches a floor surface when a load is applied. This phenomenon sometimes takes place, for example, when taking the weight of a human by using a body weighing machine, which is a type of weighing scale, when the body weighing machine is placed on a flexible floor surface such as a carpet or a tatami mat (Japanese straw mat flooring) or on an unlevel floor surface. When this bottoming takes place, the bottom portion of a base plate unit receives a reaction force from the floor, and as a result, a measured weight will be less than the actual weight, which is an error state.

As a technique for coping with this bottoming, there is disclosed, for example, in Japanese Patent Application Laid-Open Publication No. 8-247832, a plane soleplate provided on the bottom portion of the base plate unit in a removable manner. As another conventional technique, which is commonly used, extension members for extending the leg portions supporting a base plate unit are provided in a removable manner, so as to create sufficient distance between the base plate unit and the floor surface.

In the conventional technique, the bottoming can be avoided by mounting the soleplate or the extension member if a user is aware of the problem. However, a typical user may not always be able to appropriately decide whether the floor surface on which a body weighing machine is placed is suitable for measurement. A user might not even be aware of an error even if the measurement error is caused by the bottoming because the user might misunderstand the erroneous measurement result indicating less weight and think that it indicates actual loss of weight.

SUMMARY OF THE INVENTION

Accordingly, the present invention has as an object to provide a weighing scale that is capable of reliably detecting the occurrence of bottoming without depending on a user to determine whether the bottoming has occurred, and also to provide a control method for controlling a weighing scale.

To solve the above-mentioned problems, in one aspect, the present invention provides a weighing scale having: a base plate unit; and plural leg portions for supporting the base plate unit, and the base plate unit has: a weight measurer that measures the weight for the amount of load and generates weight information; a detector that detects whether a minimum distance between the base plate unit and a floor surface is zero when the load is applied; and a generator that generates error information indicating the occurrence of an error state in a case in which it is detected that the minimum distance is zero by the detector, the error state indicating that accurate measurement of weight is impossible.

According to the present invention, because it is detected that the minimum distance between the base plate unit and the floor surface changes to zero, it is possible to reliably detect a state in which the bottom portion of the base plate unit comes into contact with the floor surface (a state in which the bottoming has occurred). Therefore, it is possible to reliably detect an error state caused by bottoming without depending on the user to determine whether bottoming has occurred. The weighing scale of the present invention includes various types of weighing scales such as body weighing machines, cooking scales, commercial scales, and industrial scales.

In a preferred embodiment of the present invention, the weighing scale may further have a notifier that notifies a user of the occurrence of an error state based on the error information generated by the generator, the notifier being provided with the base plate unit. According to this embodiment, it is possible to notify a user that an error state (i.e., bottoming) has occurred. Preferably, the notifier may include a display unit and displays, on the display unit, the occurrence of the error state based on the error information. In this case, because the weighing scale itself has a display, it is possible, with the use of a weighing scale alone, to notify a user that the occurrence of bottoming has been detected. At a display unit, the occurrence of an error may be displayed by character information or by the blinking of a lamp (for example, an LED (Light Emitting Diode)). Furthermore, the notifier includes a sound outputter for notifying that an error has occurred by a beep or a message.

In another preferred embodiment of the present invention, the above weighing scale may have an output interface for outputting the error information to an external device. In this case, because error information can be output to an external device, information for notifying a user of the occurrence of bottoming can be output from an external device, if the external device used is a display unit or a sound outputter.

In another preferred embodiment of the present invention, the detector may perform the detection based on the minimum distance corresponding to a distance between a central position (a position that is equidistant from each supporting point) of plural supporting points and the floor surface, with each supporting point being a center of each of the plural leg portions at which each leg portion supports the base plate unit. There is a type of weighing scale for which the bottom portion of a base plate unit bends under a load, and there is another type for which the base plate unit does not bend. In a case in which a weighing scale is a type for which the bottom portion of the base plate unit bends, it is highly likely that the amount of bending will be the maximum at the central position of plural supporting points of the bottom portion of the base plate unit when it is under a load. Therefore, the occurrence of bottoming can be reliably detected by defining, as the minimum distance, a distance between the base plate unit and the floor surface at the central position and by detecting that the minimum distance has changed to zero.

In still another embodiment of the present invention, the underside portion (bottom portion) of the base plate unit may have at least one concave portion that sags in the reverse direction of the floor surface and a plane portion being a portion excluding the at least one concave portion, and the detector may perform the detection based on the minimum distance corresponding to a distance between a position of the plane portion and the floor surface, the position being the closest to a central position (a position that is equidistant from each supporting point) of plural supporting points, with each supporting point being a center of each of the plural leg portions at which each leg portion supports the base plate unit.

The bottom portions of some base plate units have a concave portion instead of having a plane (flat) surface over the entire area of the bottom portion. According to the present embodiment, the occurrence of bottoming can be reliably detected even in a case in which the base plate unit has a concave portion because a distance between a position of a plane portion which is other than the concave portion and the floor surface is defined as the minimum distance, with the position being the closest to a central position of plural supporting points, and it is detected that the minimum distance has changed to zero.

In yet another embodiment of the present invention, the underside portion (bottom portion) of the base plate unit may have at least one convex portion that projects toward the floor surface, and the detector may perform the detection based on the minimum distance corresponding to a distance between a position of the convex portion and the floor surface, with the position being that which is the most projecting toward the floor surface. The bottom portions of some base plate units have a convex portion instead of having a plane (flat) surface over the entire area of the bottom portion. In this case, the distance between a convex portion and a floor surface will be the minimum distance. Therefore, according to the present embodiment, the occurrence of bottoming can be reliably detected even in a case in which the bottom portion of a base plate unit has a convex portion because a distance between the most projecting portion of a convex portion and a floor surface is defined as the minimum distance, and detection is preformed based on the measured minimum distance. This embodiment is effective also in a case in which the bottom portion of the base plate unit has both a concave portion and a convex portion.

In yet another embodiment, the detector may have plural distance measuring sensors for measuring a distance between each sensor and the floor surface, with each of the plural distance measuring sensors being mounted at plural positions of the base plate unit, and the detector may detect that the minimum distance is zero in a case in which the minimum distance obtained based on one of the values output from the plural distance measuring sensors indicates that the distance between the base plate unit and the floor surface is zero. As described above, a central position of the plural supporting points is most likely to bend (sag) in a case in which the base plate unit is supported by plural supporting points. However, the distance at the central position is not necessarily the minimum distance between the base plate unit and the floor surface, depending on a position at which the load is applied (for example, the positions of the feet of a human subject for a body weighing machine). However, according to the present embodiment, because plural distance measuring sensors are provided, the distance between the base plate unit and the floor surface is measured at plural positions, whereby it is possible to detect a state in which one of the measured distances has changed to zero. Therefore, the occurrence of bottoming can be reliably detected even in a case in which a position at which the bending is the maximum is off the central position when a weighing scale is a type for which bending is caused at the bottom portion of a base plate unit when it is under a load. Furthermore, when a weighing scale is placed on an unlevel installation surface, the position of a convex portion of the installation surface is unrelated to the central position of the supporting points. Therefore, according to the present embodiment, the occurrence of bottoming can be reliably detected in such a case.

Furthermore, in yet another embodiment, the detector may have plural switches, each of which changes to one of an on state and an off state when the distance between the base plate unit and the floor surface has changed to zero, with each of plural switches being mounted at plural positions of the base plate unit, and the detector may detect that the minimum distance is zero in a case in which at least one of the plural switches changes to one of the states. In the present embodiment, plural switches are used instead of the distance measuring sensors used in the previous paragraph. Therefore, the occurrence of bottoming can be detected in a case in which at least one of the switches changes to a certain state (an on state or an off state) that indicates that the minimum distance has changed to zero. Accordingly, the occurrence of bottoming can be reliably detected even in a case in which the amount of bending of the bottom portion of a base plate unit becomes greatest at a position that is off the central position. Furthermore, as described above, the occurrence of bottoming can be reliably detected even in a case in which a weighing scale is placed at an unlevel installation surface.

In another aspect, the present invention provides a method for controlling a weighing scale having a base plate unit and plural leg portions for supporting the base plate unit, with the base plate unit being provided with a display unit for displaying information, a weight measurer for measuring the weight for the amount of load and generating weight information, and a distance measuring sensor for, when the load is applied, measuring a distance between the sensor and a floor surface, the method performs the steps of causing the distance measuring sensor and the weight measurer to operate in parallel; and detecting whether a minimum distance between the base plate unit and the floor surface has changed to zero when the measurement by the distance measuring sensor is finished, to display on the display unit the occurrence of an error state in a case in which the minimum distance between the base plate unit and the floor surface is zero and to otherwise display the weight information on the display unit, the error state indicating that accurate measurement of weight is impossible due to bottoming. According to the present invention, because the measurement of weight by the weight measurer is executed in parallel with the measurement of the minimum distance by the distance measuring sensor, the time required for displaying error information or weight information since the time at which a human subject has stepped on the base plate unit can be reduced in comparison to the case in which the minimum distance is measured after the weight is measured.

In still another aspect, the present invention provides a method for controlling a weighing scale having a base plate unit and plural leg portions for supporting the base plate unit, with the base plate unit being provided with a display unit for displaying information, a weight measurer for measuring the weight for the amount of load and generating weight information, and a detector for detecting whether a minimum distance between the base plate unit and a floor surface has changed to zero, and the method performs steps of determining whether the measured weight is stable based on the weight information; and causing the detector to operate in a case in which the measured weight is stable, and displaying on the display unit an occurrence of a first error state in a case in which it is detected by the detector that the minimum distance between the base plate unit and the floor surface is zero, and otherwise displaying the weight information on the display unit, the first error state indicating that accurate measurement of weight is impossible due to bottoming, and causing the detector to operate in a case in which the measured weight is not stable, and displaying on the display unit an occurrence of the first error state in a case in which it is detected by the detector that the minimum distance between the base plate unit and the floor surface is zero and otherwise displaying on the display unit an occurrence of a second error state, with the second error state indicating that accurate measurement of weight is impossible due to a reason other than bottoming.

There may be an event in which the measurement results of weight are unstable. This instability could be due to bottoming, but it is sometimes due to a reason other than bottoming. According to the present embodiment, because it is possible to distinguish an error state due to bottoming from an error state due to a reason other than bottoming when the instability in the measurement results is observed, the occurrence of an error due to bottoming can be reliably detected without depending on the user to determine whether the bottoming has occurred.

DETAILED DESCRIPTION OF PREFERRED EMBODIMENTS

First Embodiment

Figure 1:
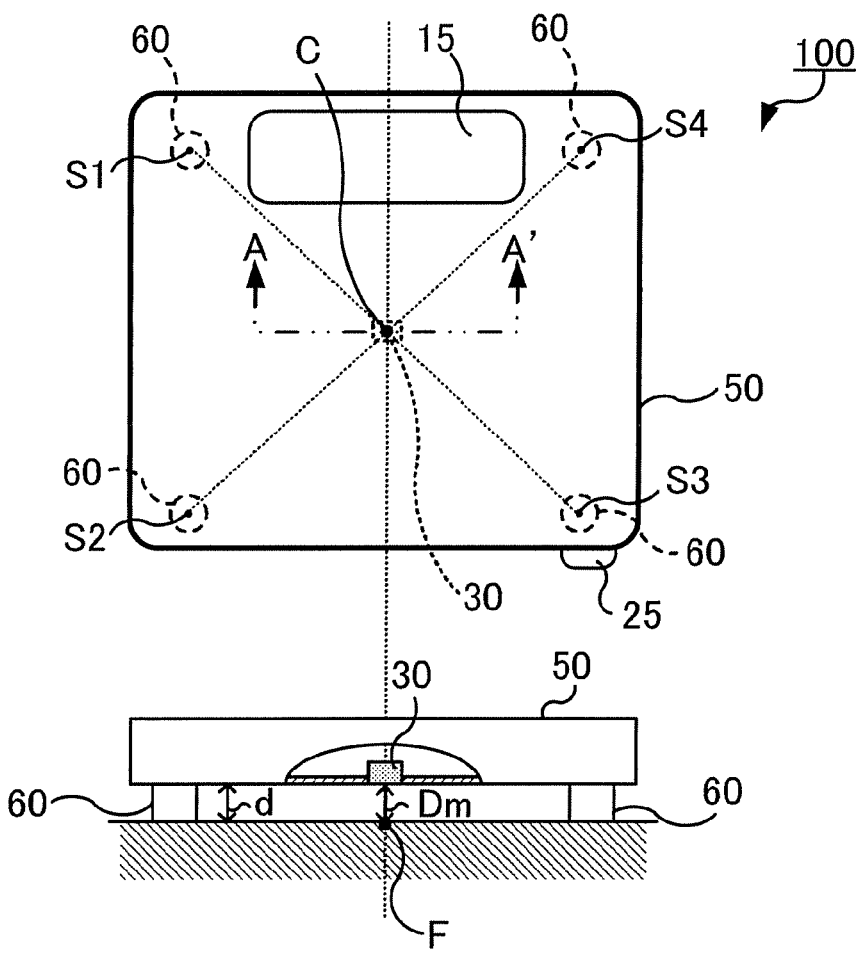
FIG. 1 is a plane view illustrating a body weighing machine and a partial cutaway front view of the plane view along the line A-A' according to a first embodiment of the present invention.
Figure 2:
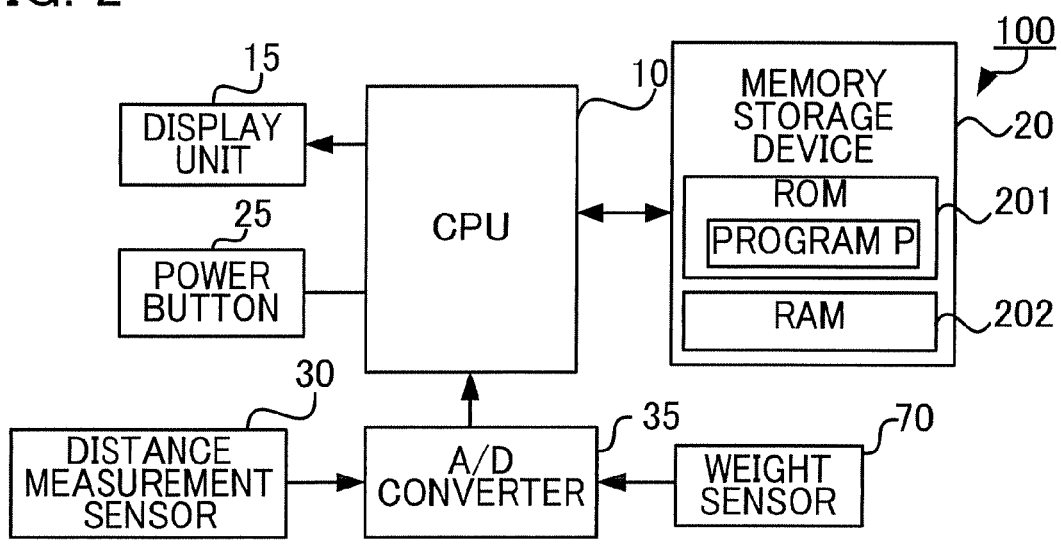
FIG. 2 is a block diagram illustrating an electrical configuration of the body weighing machine.

Description will be given of a body weighing machine according to a first embodiment of the present invention, with reference to FIGS. 1 to 7. The upper portion of FIG. 1 is a plane view of a body weighing machine 100 according to the present embodiment, and the lower portion of FIG. 1 is a front view of body weighing machine 100, with a partial cutaway thereof along the line A-A' (partial cutaway front view). FIG. 2 is a block diagram illustrating an electrical configuration of body weighing machine 100.

As shown in FIGS. 1 and 2, body weighing machine 100 has a base plate unit 50, four leg portions 60 supporting base plate unit 50 at supporting points S1 to S4, and a distance measuring sensor 30 positioned at the center of base plate unit 50. Each supporting point S1 to S4 is the center of each leg portion 60. As shown in FIG. 1, each leg portion 60 of the present embodiment is columnar. Therefore, each supporting point S1 to S4 is the center of a circle of the column.

Provided on top of base plate unit 50 of body weighing machine 100 is a display unit 15 for displaying various types of information such as measured results and error messages. Display unit 15 is, for example, an LCD (Liquid Crystal Display). Furthermore, inside base plate unit 50 is a memory storage device 20 and a weight sensor 70 for outputting an analog electric signal corresponding to a weight of a human subject, and an analog to digital (A/D) converter 35 for converting an analog signal output from each of distance measuring sensor 30 and weight sensor 70 into a digital signal, and a CPU 10 for controlling each unit of the machine 100. Memory storage device 20 has a ROM (Read Only Memory) 201 and a RAM (Random Access Memory) 202. ROM 201 is a non-volatile memory and has stored in advance therein a bottoming detection program P according to the present embodiment. RAM 202 is used as a work area of CPU 10. Weight sensor 70, for example, has an elastic body and strain gauges fitted thereto and outputs changes in voltage caused by the strains of the strain gauges. CPU 10 generates weight information based on a digital signal supplied from weight sensor 70 through A/D converter 35. Therefore, CPU 10 and weight sensor 70 together serve as a weight measurer for measuring a weight based on the load applied and generating weight information. Furthermore, base plate unit 50 is provided with a power button 25 for turning the power of body weighing machine 100 into an on state. It is to be noted that detailed description will be omitted of the configuration of base plate unit 50, and that body weighing machine 100 adopts a known structure of a conventional body weighing machine. Therefore, weighing machine 100 can be made in various configurations.

Distance measuring sensor 30 is, for example, a light-emitting element for emitting infrared rays and a light-receiving element for receiving a reflected light from a target point and for converting the light into an electric signal. The light receiver is an optical range finder and generates an analog electric signal corresponding to the distance from a position of the sensor to a position of whatever is directly in front of the sensor. More specifically, the light receiver receives a light reflected from a point at which the straight line in the direction of a distance measuring axis of the sensor intersects with an object. In the present embodiment, distance measuring sensor 30 is mounted in a through-hole provided on the bottom portion of base plate unit 50 in such a manner that the start of the distance measuring axis is in plane with the bottom surface of base plate unit 50 (the underside of the bottom portion). Furthermore, the distance measuring axis is pointing to the floor surface and is vertical to the bottom surface of base plate unit 50. With the above configuration, distance measuring sensor 30 is capable of measuring a distance Dm between the bottom surface of base plate unit 50 and a target point ("F" in FIG. 1) on the floor. CPU 10 generates distance information showing distance Dm based on a digital signal supplied from distance measuring sensor 30 through A/D converter 35.

The bottoming is a phenomenon in which, when the human subject steps on the body weighing machine (i.e., when a load is applied), the bottom portion of base plate unit 50 comes into contact with the floor surface. In the event of bottoming, the bottom portion of the base plate unit receives a reaction force from the floor, and as a result, a measurement error will result. Specifically, a measurement result that is less than the actual body weight will be output. Thus, the accurate measurement of body weight will be impossible.

FIGS. 3A to 6B show example situations in which the bottoming can take place. There is a type of body weighing machine in which bending is caused at the bottom portion of its base plate unit when a load is applied, and another type in which bending is not caused. A body weighing machine WA illustrated in each of FIGS. 3A and 3B, 4A and 4B is the type of body weighing machine in which bending is not caused.

Figure 3A:
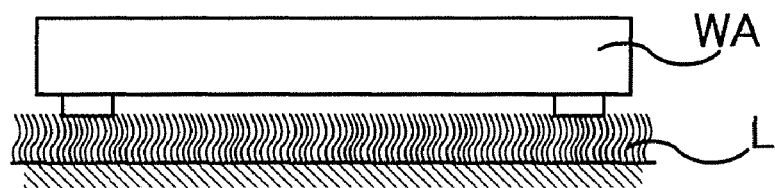
FIGS. 3A and 3B are diagrams for describing a situation in which bottoming can take place.
Figure 3B:
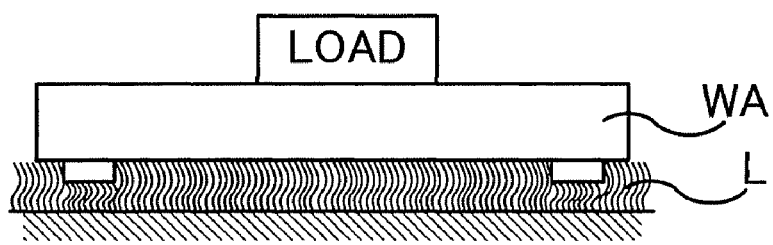

In FIGS. 3A and 3B, body weighing machine WA is placed on a thick-pile carpet (shag carpet). In this example, as shown in FIG. 3A, the leg portions of body weighing machine WA are on the tip of the carpet L when the machine is without a load, but as shown in FIG. 3B, the leg portions sink into the carpet L (i.e., the carpet L is pushed down halfway) under a load. As a result, the bottom portion of body weighing machine WA comes into contact with the carpet L, whereby bottoming occurs.

Figure 4A:
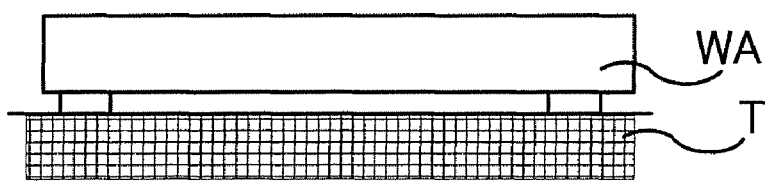
FIGS. 4A and 4B are diagrams for describing a situation in which bottoming can take place.
Figure 4B:
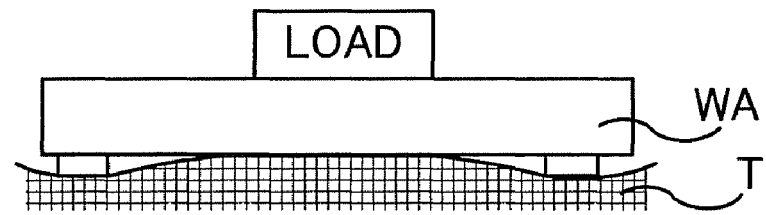
Figure 5A:
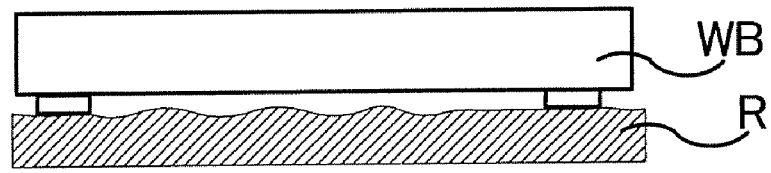
FIGS. 5A and 5B are diagrams for describing a situation in which bottoming can take place.
Figure 5B:
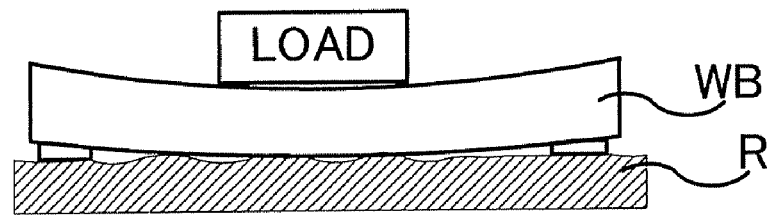

FIGS. 4A and 4B show an example in which body weighing machine WA is placed on a tatami mat T. In this example, as shown in FIG. 5A, when body weighing machine WA is without a load, its leg portions are on tatami mat T, causing little deformation of tatami mat T. As shown in FIG. 5B, when the load is applied to body weighing machine WA, tatami mat T will sag downward at portions where leg portions 60 of body weighing machine WA contact tatami mat T, whereas the other portions of tatami mat T will be raised. As a result, the bottom portion of body weighing machine W and the raised portions of tatami mat T come into contact with each other, thereby causing bottoming. A similar problem can occur in the case of a thin-pile carpet. Although the above examples relate to a body weighing machine in which bending is not caused, the same problem can also occur in another type of body weighing machine in which bending is caused at the bottom portion of a base plate unit.

FIGS. 5A and 5B, 6A and 6B show different examples of bottoming for a body weighing machine WB, a type of body machine in which bending of the bottom portion of a base plate unit is caused. FIGS. 5A and 5B show an example in which body weighing machine WB is placed on an irregular floor surface R. As shown in FIG. 5A, when body weighing machine WB is without a load, its bottom portion is not in contact with floor surface R. When the load is applied as shown in FIG. 5B, the bottom portion of the base plate unit and the convex portion of the floor surface R come into contact with each other.

Body weighing machine WB in which bending is caused is designed so that the bottom portion of the base plate unit and the floor surface will not come into contact due to bending, even in a case in which the bottom portion of a base plate unit bends in a situation in which the body weighing machine is placed on a sufficiently hard and flat floor surface. However, in a case in which there is irregularity in the floor surface, the distance between the base plate unit and the floor surface at a convex portion can fall below a value assumed at the time of design. If the bending distance of the bottom portion of the base plate unit is equal to or greater than the actual distance between the base plate unit and the floor surface (especially, the convex portion of the floor surface), bottoming will occur.

Figure 6A:
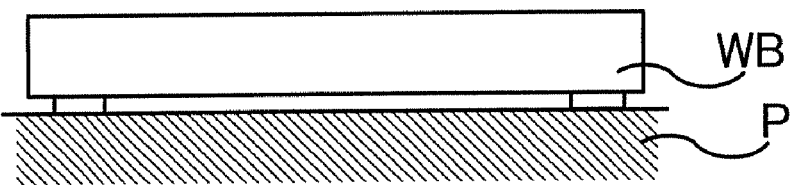
FIGS. 6A and 6B are diagrams for describing a situation in which bottoming can take place.
Figure 6B:
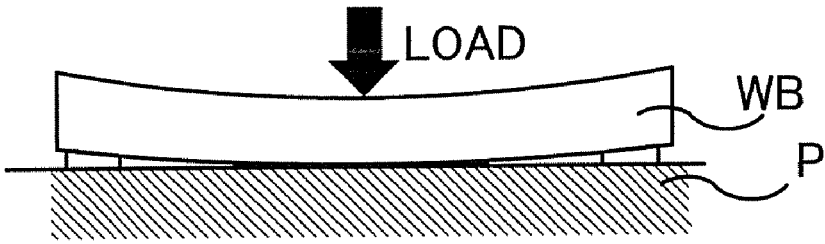

FIGS. 6A and 6B show an example in which body weighing machine WB is placed on a sufficiently hard and flat floor surface P, but bottoming has occurred. As described above, a type of body weighing machine WB in which bending is caused is designed so that bottoming will not occur even when the body weighing machine is placed on the floor surface P and when bending is caused at the bottom portion of the base plate unit, the design having been made in view of the amount of bending that could be caused in such a case. However, this amount of bending is calculated assuming that a human subject stands on the base plate unit with both feet at roughly predetermined positions. Therefore, if load is concentrated at a place other than the predetermined positions (for example, if a human subject stands on the base plate unit with one foot), bottoming could occur. FIG. 6B is an example in which bottoming is caused because the amount of load beyond assumptions is concentrated at nearly the central portion of the base plate unit.

Body weighing machine 100 according to the present embodiment is a type of body weighing machine in which bending is caused at the bottom portion of the base plate unit when the machine is under a load, and base plate unit 50 of body weighing machine 100 is supported by four leg portions at supporting points S1 to S4 as shown in FIG. 1. Therefore, the amount of bending of the bottom portion of base plate unit 50 is likely to be the greatest (i.e., distance Dm is likely to be the smallest) at a central position C of supporting points S1 to S4 (i.e., a position that is equidistant from each supporting point S1 to S4). Therefore, the bottom portion of base plate unit 50 is most likely to come into contact with the floor surface at the central position C. For this reason, in the present embodiment, distance measuring sensor 30 is provided at a position at which the amount of bending of the bottom portion of base plate unit 50 is likely to be the greatest, to measure distance Dm between base plate unit 50 and the floor surface. Because the starting point of the distance measuring axis for distance measuring sensor 30 lies in a plane of the bottom surface of base plate unit 50 at a position at which the bottom portion of base plate unit 50 is the most bent, the measured distance Dm will be equal to the minimum distance D, given that the minimum distance D is the shortest one of plural distances between the bottom surface of base plate unit 50 and the floor surface (i.e., the minimum distance D is a distance between the bottom portion of base plate unit 50 and the floor surface at the most bent position).

As an alternative embodiment, distance measuring sensor 30 does not necessarily have to be placed at the central position C because the minimum distance D under a load does not have to be directly measured, but may instead be obtained through calculation. Specifically, by providing distance measuring sensor 30 off the central position C, CPU 10 may obtain distance Dm between the bottom surface of base plate unit 50 and the floor surface to calculate the minimum distance D based on the measured distance Dm. In a case in which a body weighing machine is one in which bending is not caused under a load, distance measuring sensor 30 does not have to be provided at the central position C of supporting points S1 to S4, and the position of distance measuring sensor 30 can be freely chosen.

In the present embodiment, CPU 10 determines whether the minimum distance D has changed to zero based on a measured result of distance measuring sensor 30, so as to detect the occurrence of bottoming when the minimum distance D has changed to zero. This determination process will be described later in detail.

In a case in which it is detected that the bottoming has taken place, error information indicating that the bottoming has taken place will be displayed on display unit 15, thereby notifying a user of the event. By looking at the error information, a user can then be prompted to move body weighing machine 100 to another floor surface, to have a body weight measured again, and if the floor surface is suitable for measurement (i.e., if bottoming is not detected), the user can regard the measured result as being satisfactory. It is to be noted that, in the present embodiment, description has been and will be given assuming that a user and a human subject are the same person, but the user and the human subject may be different people.

Figure 7:
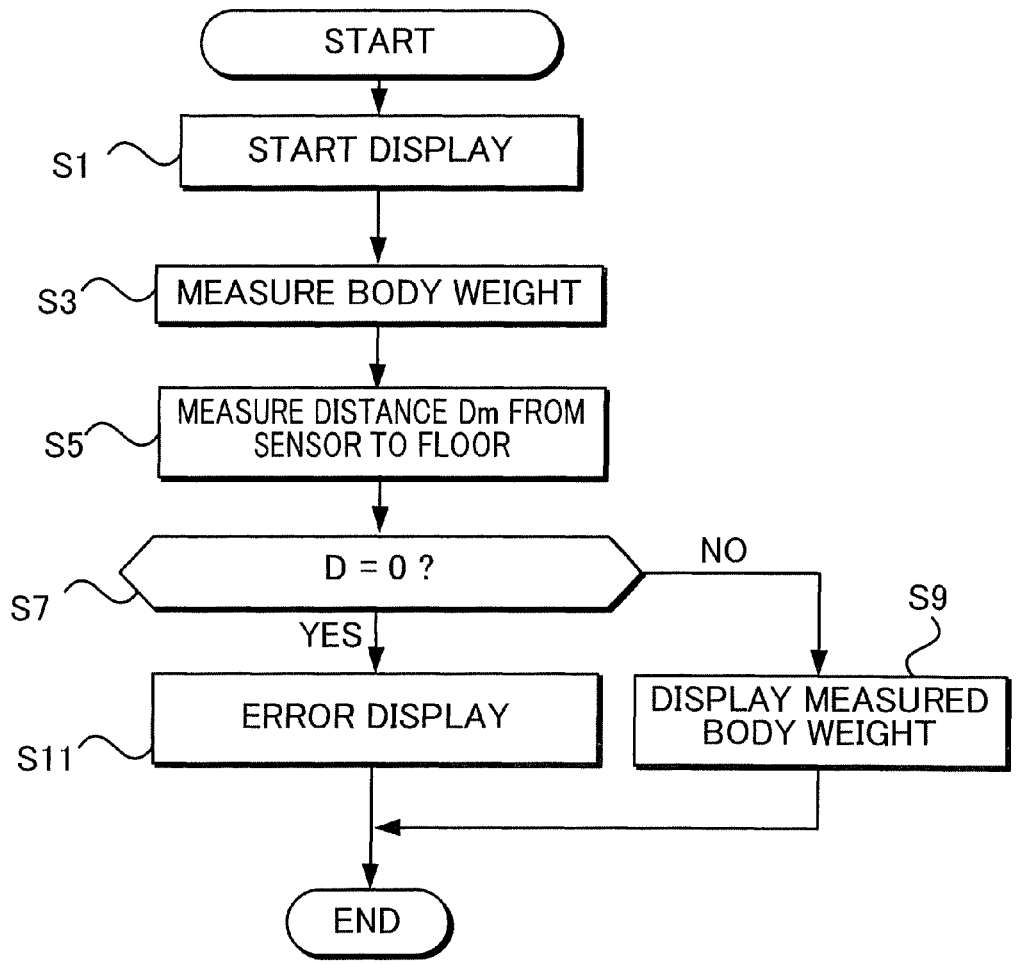
FIG. 7 is a flowchart illustrating a procedure of a bottoming detection process performed by the body weighing machine.

FIG. 7 is a flow chart illustrating a procedure of the bottoming detection process according to the present embodiment.

As described above, there is stored, in ROM 201, a bottoming detection program P (a computer program or computer program elements) describing the procedure shown in the flowchart. CPU 10 operates in accordance with this bottoming detection program P. In this embodiment, ROM 201 is used as a medium for storing bottoming detection program P, but a hard disk, a compact disk, a digital versatile disk, a flexible disk, or other suitable recording medium can be used to store the computer program or the computer program elements.

The operation illustrated in FIG. 7 is started when power button 25 in FIG. 1 is pressed by a user (i.e., a human subject). CPU 10 first drives display unit 15 to start displaying in Step S1. For example, "0.00 kg" is displayed on display unit 15. That is, when power button 25 is pressed, the body weighing machine enters a state in which a body weight can be measured.

Subsequently, in Step S3, CPU 10 measures a body weight of the human subject. Specifically, CPU 10 generates weight information based on a digital signal supplied from weight sensor 70 through A/D converter 35, to temporarily store the generated weight information in RAM 202.

In Step S5, CPU 10 gives a drive instruction signal to distance measuring sensor 30, thereby to drive distance measuring sensor 30. When a digital distance signal is input from A/D converter 35, CPU 10 temporarily stores the distance signal in RAM 202 as distance information.

In Step S7, CPU 10 reads distance information temporarily stored in RAM 202, to determine whether the distance information showing distance Dm (minimum distance D in the present embodiment) is zero. In a case in which a result of determination in Step S7 is affirmative, CPU 10 determines that an error state has occurred. In the error state, the accurate measurement of body weight is impossible. In this case, the routine proceeds to Step S11 and displays on display unit 15 error information, for example, an error code, "E3", indicating bottoming, and ends the process. This enables the user to be aware of the occurrence of bottoming based on the error code "E3". On the other hand, in a case in which a result of determination in Step S7 is negative, the process proceeds to Step S9. In Step S9, CPU 10 reads weight information temporarily stored in RAM 202, for display on display unit 15 as a result of measurement and then ends the detection process.

The determination in Step S7 is not limited to a determination as to whether the distance Dm (i.e., minimum distance D) is zero. For example, the distance between the base plate unit and the floor surface may be considered to be zero in a case in which distance Dm is in a predetermined range. As an alternative, since the length of leg portion 60 is a known value, a distance d between the bottom surface of base plate unit 50 and the floor surface is known. Therefore, by storing distance d in advance in ROM 201, CPU 10 obtains a difference G between distance d and distance Dm measured by distance measuring sensor 30 (G=d−Dm). CPU 10 then may proceed to Step S9 only when G>0 is satisfied, and in Step S9 weight information is displayed as a result of measurement on display unit 15. On the other hand, when G≦0 is satisfied, CPU 10 detects the occurrence of bottoming and proceeds to Step S11.

As described above, in the present embodiment, distance measuring sensor 30 is mounted on base plate unit 50, and the distance between distance measuring sensor 30 and the floor surface is measured. Therefore, according to the present embodiment, without depending on a user to determine whether the bottoming has taken place, it is possible to reliably detect the bottoming. A user can become aware, without the need to determine whether the bottoming has occurred, that the machine is in a bottoming state by merely looking at the error display indicating the occurrence of bottoming and can properly fix the error state of the bottoming.

Figure 8:
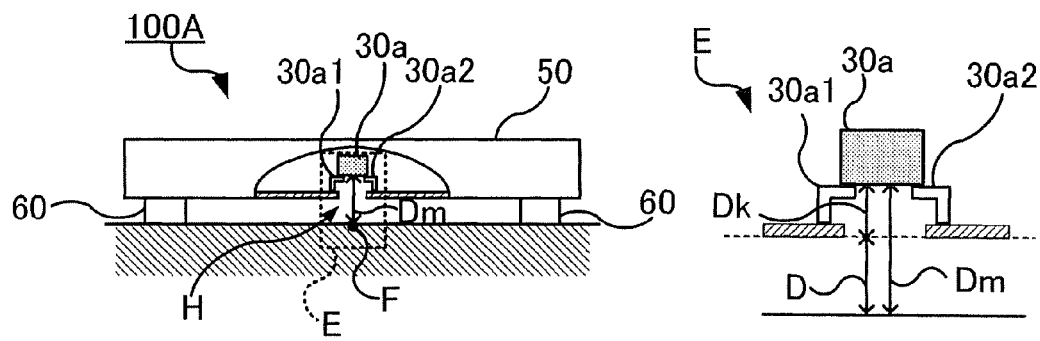
FIG. 8 is a partial cutaway front view illustrating a body weighing machine according to a modification of the first embodiment.

FIG. 8 shows a partial cutaway front view illustrating a body weighing machine 100A according to a modification of the present embodiment. As shown in FIG. 8, in the present modification, a distance measuring sensor 30a is placed inside base plate unit 50 instead of being placed on a plane of the bottom surface of base plate unit 50.

More specifically, as shown in FIG. 8, a through-hole H is provided on the bottom portion of base plate unit 50. Provided inside base plate unit 50 in the outer rim of the through-hole H are supporting members 30a1 and 30a2 for supporting distance measuring sensor 30a. With this configuration, distance measuring sensor 30a is allowed to measure distance Dm between the starting point of the distance measuring axis for the sensor and the target point F on the floor surface. As is understood from a figure E in the right portion of FIG. 8, a distance Dk from distance measuring sensor 30a to the plane of the bottom surface of base plate unit 50 is known. Therefore, CPU 10 is allowed to obtain, based on the distance between Dm and Dk, minimum distance D between the bottom surface of base plate unit 50 and the floor surface (D=Dm−Dk). When it is detected that the minimum distance D is zero, CPU 10 generates error information showing that the bottoming has taken place, and displays the occurrence of bottoming on display unit 15 based on the error information, thereby notifying the user of the occurrence.

Second Embodiment

Figure 9:
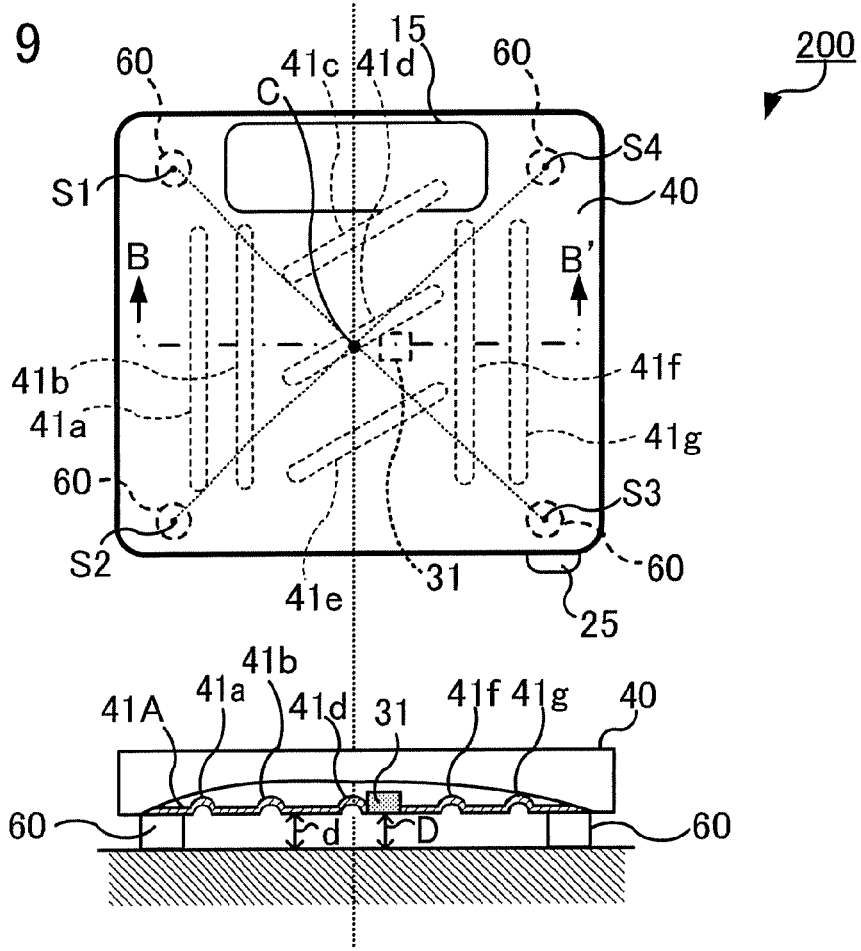
FIG. 9 is a plane view illustrating a body weighing machine and a partial cutaway front view of the plane view along the line B-B' according to a second embodiment of the present invention.

In the following, with reference to FIG. 9, a body weighing machine according to a second embodiment of the present invention will be described. The upper portion of FIG. 9 is a plane view of a body weighing machine 200 according to the present embodiment, and the lower portion of FIG. 9 is a front view of body weighing machine 200, with a partial cutaway thereof along the line B-B' (partial cutaway front view). In the present embodiment, description will be given of a case in which the base plate unit has concave portions that sag toward the inside of the base plate unit instead of having a flat bottom surface as in the above embodiment. In the following description, the same reference numerals will be assigned to the same elements as in the above embodiment, and descriptions thereof will be omitted.

As shown in FIG. 9, base plate unit 40 of body weighing machine 200 has plural concave portions 41a to 41g, each of which sags toward the inside base plate unit 40, and a plane portion 41A excluding concave portions 41a to 41g. These concave portions 41a to 41g, called a "bead", are formed to increase rigidity of base plate unit 40, as well as to enhance designing quality. This makes it possible to reduce the bending of the bottom portion of base plate unit 40 when a human subject steps on body weighing machine 200. Furthermore, base plate unit 40 is provided with a distance measuring sensor 31 instead of distance measuring sensor 30.

As described in the above embodiment, it is preferable to locate distance measuring sensor 31 on the central position C of supporting points S1 to S4, especially when the bottom portion of the base plate unit of a body weighing machine is of a bendable type. However, as in the present embodiment, when there are concave portions at base plate unit 40 and when the central position C of supporting points S1 to S4 overlap one of the concave portions, the central position C is not the minimum distance D between the base plate unit and the floor surface. Therefore, as shown in FIG. 9, in the present embodiment, distance measuring sensor 31 is mounted at a position which is closest to the central position C of plane portion 41A excluding concave portions 41*a* to 41*g*. With this configuration, the distance Dm between the position closest to the central position C and the floor surface is obtained by distance measuring sensor 31 as the minimum distance D, and it is determined whether the minimum distance D is equal to zero.

According to the present embodiment, because distance measuring sensor 31 is mounted at a position on plane portion 41A, the position being the closest to the central position C, it is possible to measure a distance of a position which is most likely to come into contact with the floor surface when the bottom portion of base plate unit 40 bends under a load (i.e., minimum distance D). Thus, the same effects as in the first embodiment can also be attained according to the present embodiment.

Each concave portion may be of any other shape, such as a round shape, although groove-like concave portions 41*a* to 41*g* are provided at the bottom portion of base plate unit 40 as shown in FIG. 9, and plural concave portions do not have to have the same shape or be of the same size. Furthermore, the number or the position of concave portions is not limited to what is shown in the figure.

Furthermore, in the present embodiment, description was given of a case in which the bottom portion of base plate unit 40 has plural concave portions that sag toward the reverse direction of the floor surface. However, the shape of the bottom portion of base plate unit 40 is not limited to the shown embodiment.

Figure 10:
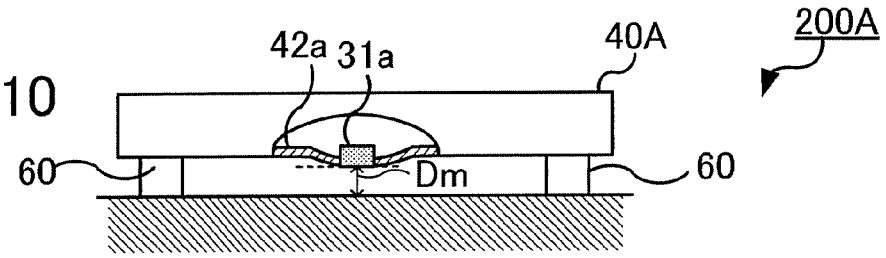
FIG. 10 is a partial cutaway front view of a body weighing machine according to a modification of the second embodiment.
Figure 11:
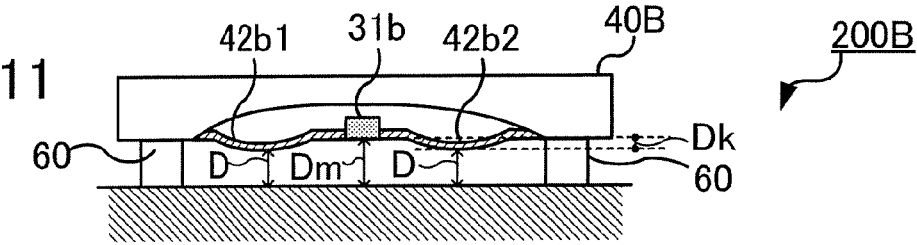
FIG. 11 is a partial cutaway front view illustrating a body weighing machine according to a modification of the second embodiment.

FIGS. 10 and 11 illustrate a modification in which the bottom portion of base plate unit 40 has plural convex portions that project toward the floor surface, in contrast to the second embodiment.

As shown in FIG. 10, the bottom portion of base plate unit 40A for body weighing machine 200A has a convex portion 42*a*. In this case, a distance between the most projecting position of convex portion 42*a* and the floor surface will be the minimum distance D between base plate unit 40A and the floor surface. Accordingly, in the present modification, a distance measuring sensor 31*a* is mounted on the most projecting portion of convex portion 42*a*, thereby causing distance measuring sensor 31*a* to measure distance Dm (=minimum distance D).

Furthermore, as shown in FIG. 11, in body weighing machine 200B, there are two convex portions 42*b*1 and 42*b*2 on the bottom portion of base plate unit 40B. In this case, a distance between the most projecting portion of each convex portion 42*b*1 and 42*b*2 and the floor surface will be a minimum distance D between base plate unit 40A and the floor surface. However, in the example shown in FIG. 11, a distance measuring sensor 31*b* is provided not on the most projecting portion of each convex portion 42*b*1 and 42*b*2, but on a plane portion lying between the two convex portions. In this configuration, given that a vertical distance between the starting point of the distance measuring axis of distance measuring sensor 31*b* and the bottom surface of each convex portion 42*b*1, 42*b*2 is Dk and that a measured value of distance measuring sensor 31*b* is Dm, D will be Dm minus Dk (D=Dm−Dk). Therefore, even in a case in which distance measuring sensor 31*b* is positioned in this way, it is possible to obtain a value of minimum distance D. According to this modification, the same effects as in the above second embodiment can be attained.

As described above, the shape, the size, or the number of concave portions or convex portions at the bottom portion of base plate unit 40 of the body weighing machine is not limited to what is shown in FIGS. 9 to 11, and therefore, the position and the number of a distance measuring sensor should be determined as is appropriate in a manner in which the minimum distance D can be measured or can be obtained based on a measured value.

Although there are shown in FIGS. 9 to 11 examples of distance measuring sensors 31, 31*a*, 31*b* being mounted so that the starting point of the distance measuring axis will be on the plane of the bottom surface of base plate unit 40, 40A, 40B, each distance measuring sensor 31, 31*a*, 31*b* may be positioned at the inside of each base plate unit 40, 40A, 41B as shown in FIG. 8. Also in this case, CPU 10 may obtain the minimum distance D based on the vertical distance Dk between the starting point of the distance measuring axis of distance measuring sensor 31*b* and the bottom surface of each convex portion 42*b*1, 42*b*2 and a value Dm measured by distance measuring sensor 31*b*.

Third Embodiment

Figure 12:
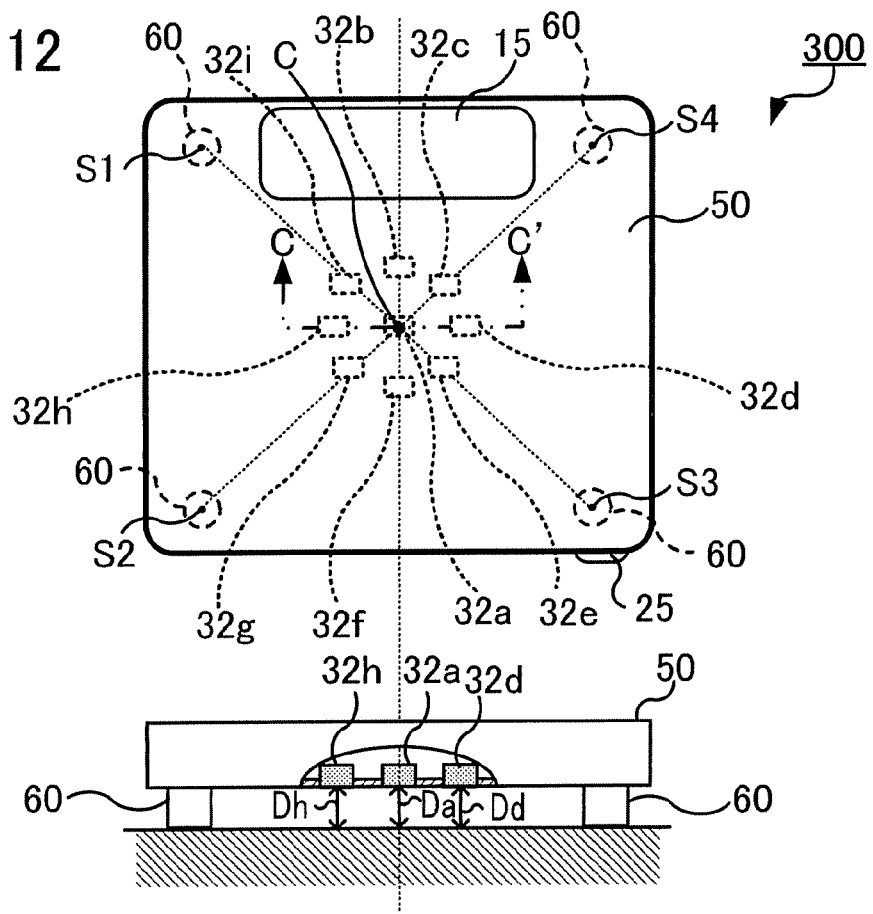
FIG. 12 is a plane view illustrating a body weighing machine and a partial cutaway front view of the plane view along the line C-C' according to a third embodiment of the present invention.

In the following, description will be given of a body weighing machine according to a third embodiment of the present invention with reference to FIG. 12. The upper portion of FIG. 12 is a plane view of a body weighing machine 300 according to the present embodiment, and a front view of body weighing machine 300, with a partial cutaway thereof along the line of C-C' (partial cutaway front view). In the following description, the same reference numerals will be assigned to the same elements as in the above embodiment, and descriptions thereof will be omitted.

In the above first embodiment, description was given of a case in which one distance measuring sensor 30 is mounted at the central position C of supporting points S1 to S4. However, the size of the feet of a human subject or the center of gravity placed on the base plate unit depends on the human subject, and the position of the base plate unit on which a human subject stands varies. Therefore, the central position C is not always the most bent position. Accordingly, the present embodiment is configured in a manner in which plural distance measuring sensors 32 (32*a* to 32*i*) are mounted at base plate unit 50. Specifically, as shown in the upper portion of FIG. 12, base plate unit 50 has a distance measuring sensor 32*a* mounted at the central position C and distance measuring sensors 32*b* to 32*i* mounted in such a manner that distance measuring sensors 32*b* to 32*i* surround distance measuring sensor 32*a* in a circle. With this configuration, CPU 10 causes each distance measuring sensor 32 to measure each distance Da to Di between each sensor and the floor surface and determines that the bottoming has occurred in a case in which at least one of distances Da to Di is zero, so as to execute the error display in Step S11.

According to the present embodiment, the same effects as in the above embodiment can be attained. Furthermore, it is possible to detect the occurrence of bottoming even in a case in which a position at which the bottoming has taken place is off the central position C because a distance between base plate unit 50 and the floor surface is measured at the central position C and at plural positions near central position C so that it is determined that the bottoming has taken place when one of measured results is zero. Thus, according to the present embodiment, the bottoming is more reliably detected.

Plural distance measuring sensors 32 do not necessarily include one located at the central position C. Furthermore, the number or the positions (horizontal or vertical position) of plural distance measuring sensor 32 can be freely selected and are not limited to the example shown in the present embodiment. For example, in a case in which a body weighing machine is placed on an unlevel installation surface as illustrated in FIG. 5, the positions of convex portions of the floor have nothing to do with the central position C. Therefore, plural distance measuring sensors 32 do not have to be mounted so as to surround the central position C, but may be mounted across the entire area of base plate unit 50.

Modification 1

In the first to third embodiments, a distance measuring sensor was used to detect that a minimum distance between the base plate unit and the floor surface is zero, but a means for this detection is not limited to a distance measuring sensor.

Figure 13:
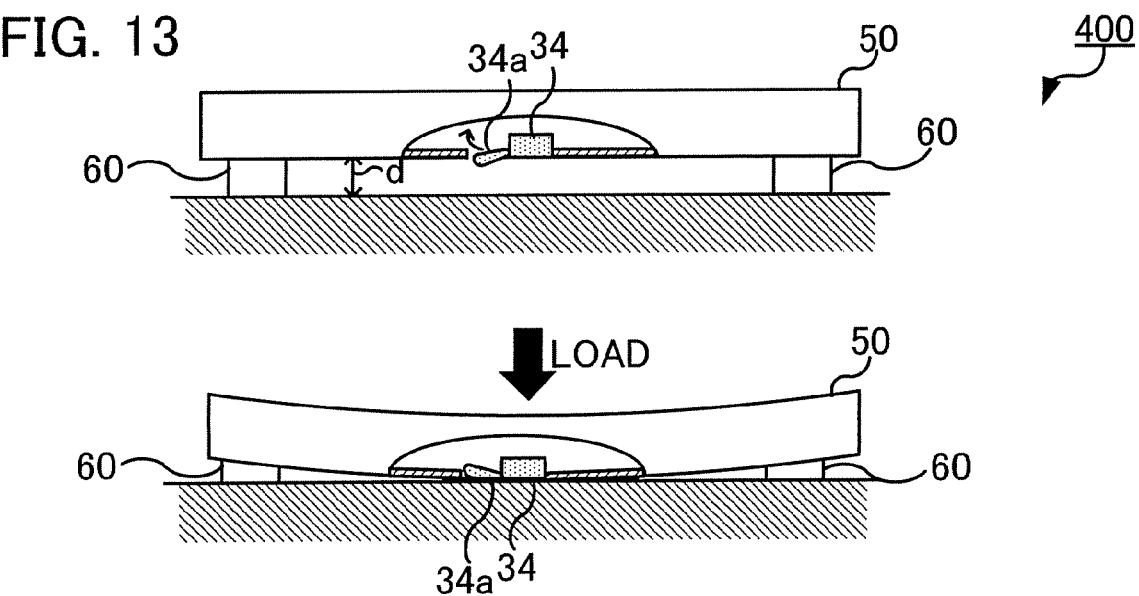
FIG. 13 is a partial cutaway front view illustrating a body weighing machine according to a modification of the first to third embodiments.

As an example, FIG. 13 illustrates a cross-sectional view of a body weighing machine 400 according to the present modification. As shown in the figure, a switch 34, instead of distance measuring sensor 30, is used in body weighing machine 400. Switch 34 turns to an on state or an off state depending on the position of a lever 34*a*. Specifically, in this modification, as shown in the lower portion of FIG. 13, when the bottom portion of base plate unit 50 bends under a load, so as to come into contact with the floor surface, lever 34*a* pops up to make switch 34 turn into an on state, and an analog signal indicating that the switch has turned into an on state will be supplied to CPU 10 via A/D converter 35. CPU 10, upon receiving the electric signal, determines that a minimum distance between base plate unit 50 and the floor surface is zero, so as to execute an error display in Step S11.

Switch 34 turns into an on state when lever 34*a* pops up and turns into an off state when lever 34*a* is down. In contrast, a switch that turns into an off state when lever 34*a* pops up and that turns into an on state when lever 34*a* is down may be used. In this case, CPU 10, upon detecting that the switch is in an off state, may determine that a minimum distance between base plate unit 50 and the floor surface has changed to zero.

According to the modification, the same effects as in each of the above embodiments and modifications can be attained.

Modification 2

In the above embodiment, description was given of a case in which CPU 10 detects the occurrence of bottoming at a body weighing machine in accordance with the bottoming detection program P corresponding to the procedure shown in FIG. 7. However, the bottoming detection program P is not limited to the procedure of bottoming detection program P.

Figure 14:
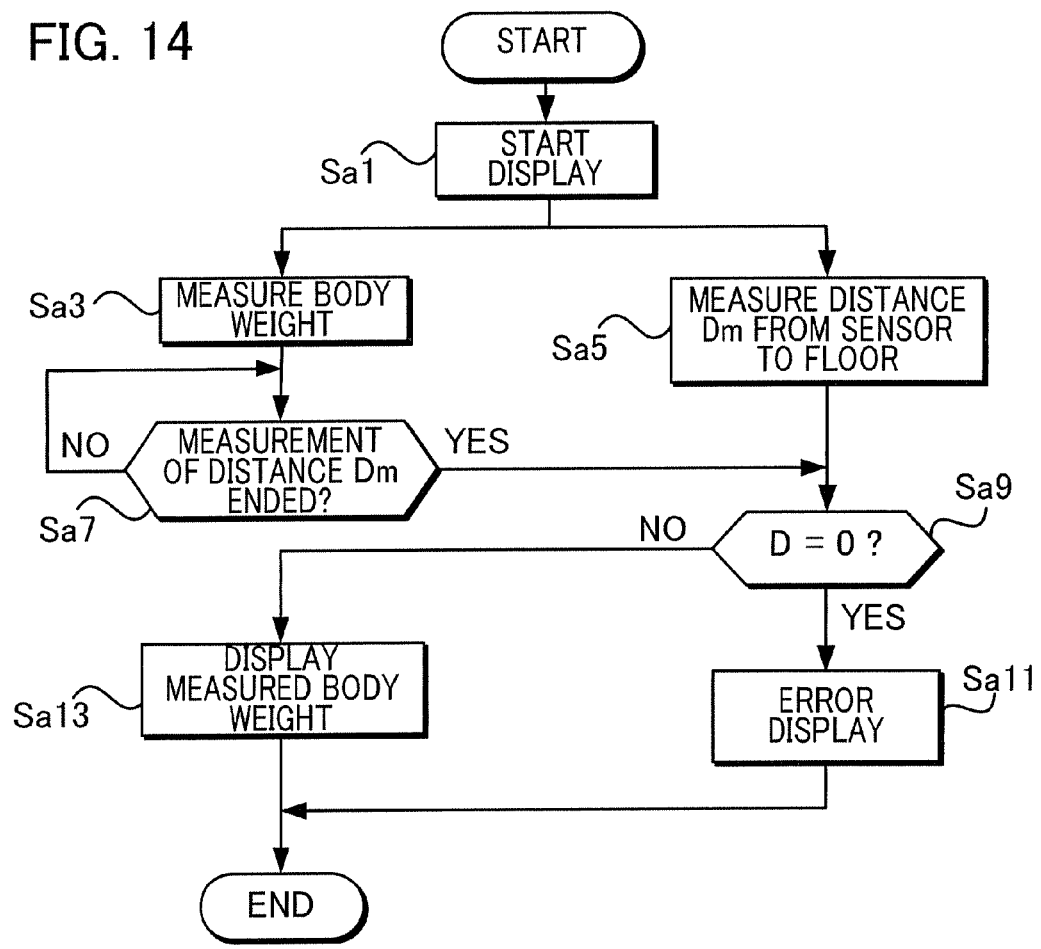
FIG. 14 is a flowchart showing a procedure of an operation according to a modification of the first to third embodiments.
Figure 15:
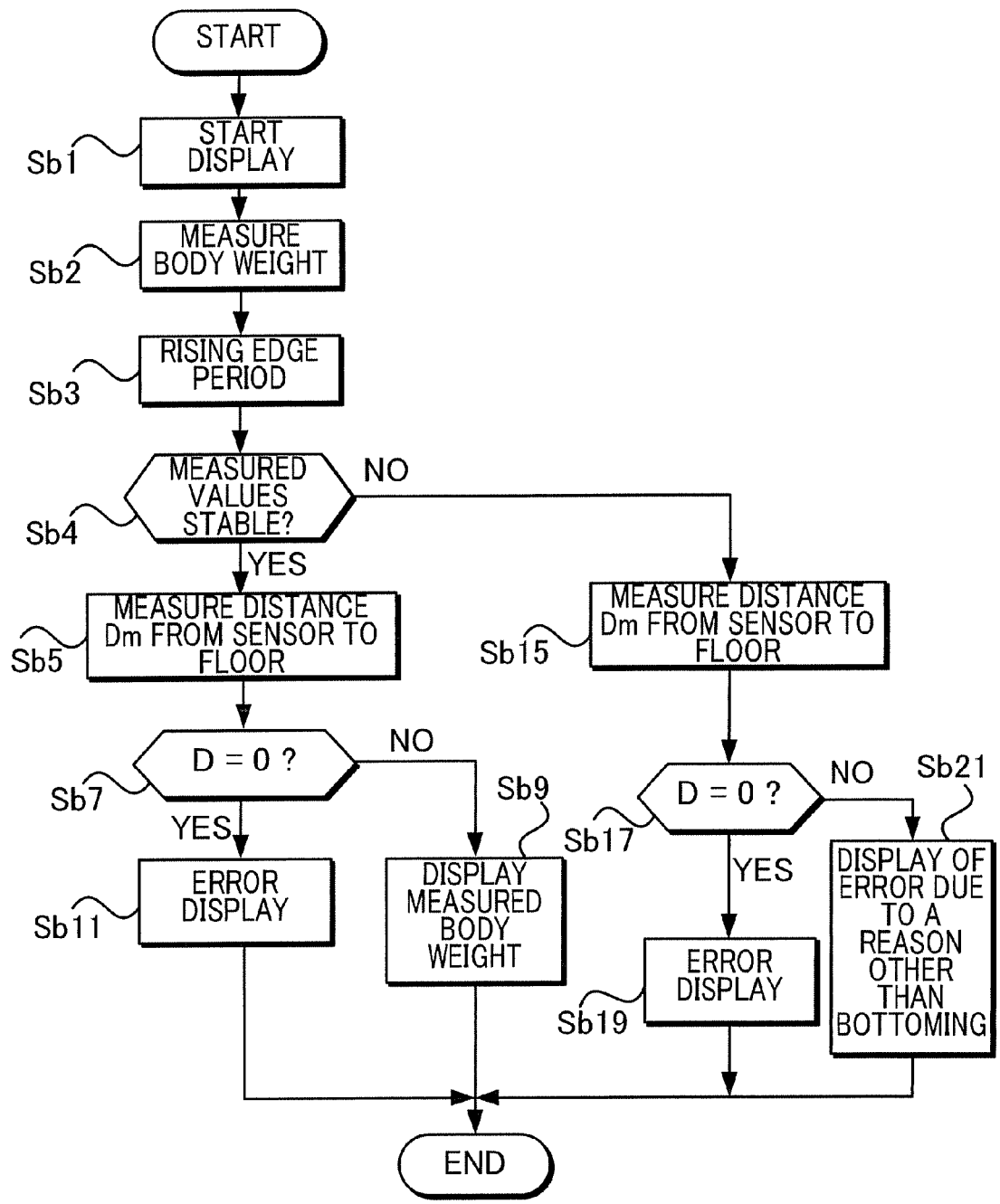
FIG. 15 is a flowchart showing a procedure of an operation according to a modification of the first to third embodiments.

FIGS. 14 and 15 are flowcharts showing procedures of bottoming detection programs P1 and P2, respectively, according to the present modification. In the following, description will be given of a case in which bottoming detection programs P1 and P2 are applied to the first embodiment. It is to be noted that the bottoming detection programs P1 and P2 can also be applied to each of the second and third embodiments.

Description will be first given of bottoming detection program P1. As shown in FIG. 14, in Step Sa1, when power button 25 is pressed, CPU 10 first drives display unit 15 and starts a display operation. Displayed on display unit 15 at this time is, for example, "0.00 kg".

In Step Sa3, CPU 10 causes weight sensor 70 to measure a body weight of a human subject to generate weight information, and in Step Sa5, CPU 10 causes distance measuring sensor 30 to measure distance Dm from this distance measuring sensor 30 to the floor surface, to generate distance information and to store each weight information and distance information temporarily in RAM 202. The process of measuring a body weight (Step Sa3) and the process of measuring distance Dm (Step Sa5) are performed in parallel with each other. It is to be noted that in the above embodiments, one A/D converter 35 was provided, to which an analog measured value is input one by one from each of weight sensor 70 and distance measuring sensor 30, but in the present modification, two A/D converters 35*a*, 35*b* (not shown) are provided for weight sensor 70 and distance measuring sensor 30, respectively. Therefore, CPU 10 loads a measured value of weight sensor 70 via A/D converter 35*a* and that of distance measuring sensor 30 via A/D converter 35*b*.

In Step Sa7, CPU 10 then determines whether the process of measuring distance Dm in Step Sa5 has ended. This determination process is repeated until a result of determination becomes positive. When the result of the determination is positive (Step Sa7; YES ), CPU 10 then determines whether a minimum distance D between base plate unit 50 and the floor surface is zero in Step Sa9. In a case in which the result of the determination is positive, CPU 10 detects the occurrence of bottoming and displays on display unit 15 that the bottoming has taken place (Step Sa11), and ends the detection process.

On the other hand, in a case in which a result of the determination in Sa9 is negative, CPU 10 proceeds to Step Sa13. In Step Sa13, CPU 10 reads weight information temporarily stored in RAM 202, to display a measured body weight based on the weight information (Sa13). The detection process is thus completed.

As described above, in the present embodiment, measuring of a body weight by weight sensor 70 and measuring of a distance by distance measuring sensor 30 are executed in parallel. Therefore, compared with a case in which a detection process is performed in accordance with the bottoming detection program P (FIG. 7), the time required since the time at which a human subject stepped onto body weighing machine 100 until the occurrence of bottoming is displayed is reduced. Furthermore, because the time required for detecting the occurrence of bottoming is reduced, detection of no bottoming is executed rapidly, and therefore, the period of time required until a body weight is displayed is also reduced.

Description will next be given of bottoming detection program P2.

As shown in FIG. 15, in Step Sb1, when power button 25 is pressed, CPU 10 first drives display unit 15 to start a display operation. Displayed on display unit 15 is, for example, "0.00 kg".

Figure 16:
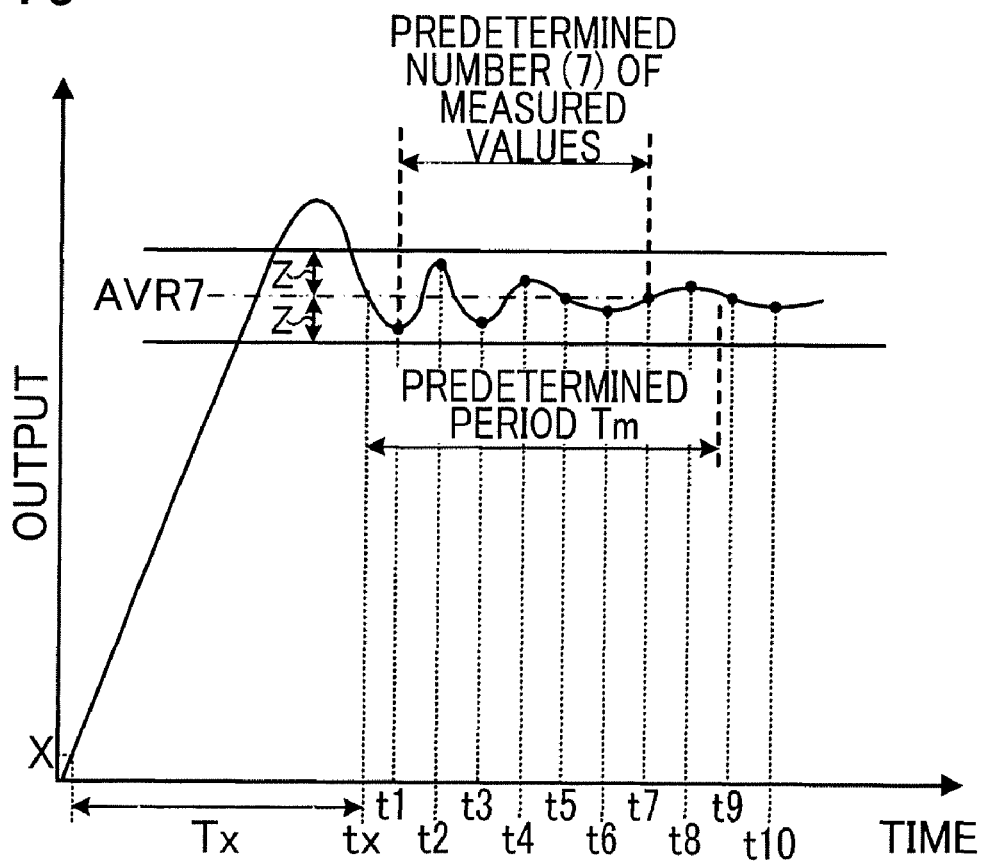
FIG. 16 is a graph illustrating a relationship between measured values of a body weight and measured points in time.

Subsequently, in Step Sb3, CPU 10 causes weight sensor 70 to measure a body weight of a human subject and generates weight information, so as to store the weight information temporarily in RAM 202. When a human subject steps onto body weighing machine 100, a result of measurement indicated by weight information converges to a certain value as time advances, for example, as shown in FIG. 16. However, right after a human subject steps onto body weighing machine 100, weight information does not immediately approach a convergence value; this requires a rising edge period to reach the convergence. In Step Sb3, CPU 10 waits for the rising edge period, in which the value of weight information is still an inaccurate value, to elapse. More specifically, once CPU 10 detects that weight information has increased from zero to a predetermined value X, it starts tracking the time from the start of detection and waits for a predetermined time Tx to elapse. In an example shown in FIG. 16, the rising edge period starts from a point in time at which a value of weight information being X to a time tx when a predetermined time Tx elapses.

Figure 17:
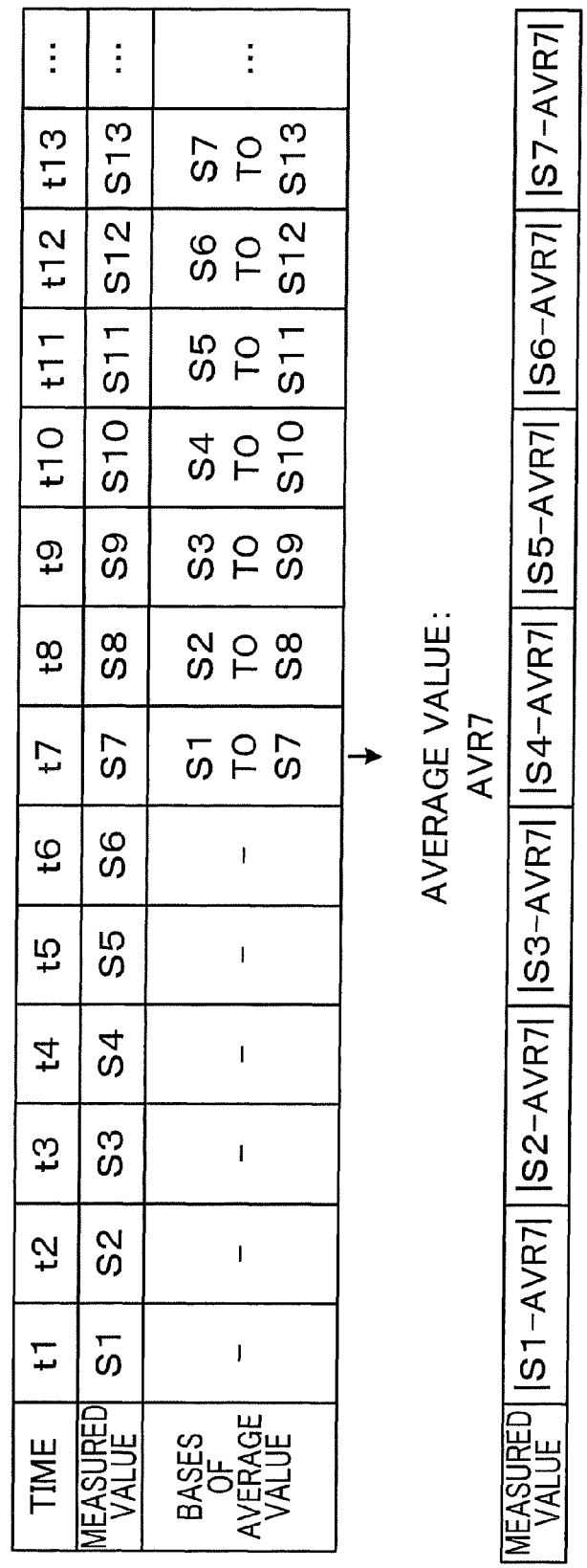
FIG. 17 is an explanatory diagram for describing an instability determination with respect to measured values of body weight.

Subsequently, in Step Sb4, CPU 10 determines whether measured values of a body weight have become stable. This determination of stability is performed based on weight information (a predetermined number of measured values) after the rising edge period has elapsed. For example, in a case in which the stability is determined based on seven measured values, calculation of an average is performed using seven consecutive measured values starting from a measured value Sn measured at the present time tn and consecutive values toward the past up to the sixth previous value (Sn, Sn−1, Sn−2, ... Sn−6), such as measured values S1 to S7 at time t7 and measured values S2 to S8 at time t8 as shown in FIG. 17, where n is a natural number that is equal to or greater than 7.

CPU 10 then calculates a difference value between the average value and each of seven consecutive values based on which the average was calculated. For example, given that the average value of measured values S1 to S7 is AVR7 as shown in FIG. 17, the difference values are obtained as shown in the figure.

CPU 10 then determines whether each difference value is within a predetermined value range Z. When it is within the predetermined value range Z, a result of the determination indicates that the measured values have become stable, and when a different value exceeds the predetermined value range Z, a result of the determination will indicate that the measured values are unstable. In the example shown in FIG. 16, it is determined that measured values are stable. The predetermined value range Z can be an error range allowed in the body weighing machine. Furthermore, in this example, the determination of stability is performed based on a predetermined number of measured values, but as shown in FIG. 16, the determination of stability may be performed based on a measured value obtained during a predetermined period Tm for measurement.

In a case in which a result of the determination in Step Sb4 in FIG. 15 is negative, i.e., measured values of a body weight are not stable, CPU 10 measures a distance Dm from the distance measuring sensor to the floor surface and regards the measured distance Dm as minimum distance D in Step Sb15.

In Step Sb17, CPU 10 then determines whether the minimum distance D is zero. In a case in which a result of the determination is positive, CPU 10 displays on display unit 15 error information indicating that the bottoming has occurred (Step Sb19), to end the process.

An error state indicating instability of measured values in a body weighing machine can be caused by bottoming or can be caused by a reason other than bottoming. When the measured values of a body weight is determined as being unstable (Step Sb4; NO) and when the minimum distance D is not zero, CPU 10 determines that this error state was not caused by bottoming, and so displays on display unit 15 that an error state has occurred for a reason other than bottoming (Step Sb21), and ends the process.

In a case in which a result of determination in Step Sb4 is positive, i.e., measured values of a body weight are stable, CPU 10 proceeds to Step Sb5, to measure distance Dm from base plate unit 50 to the floor surface. CPU 10 then determines whether the measured distance Dm (i.e., minimum distance D) is equal to zero in Step Sb7. In a case in which a result of this determination is positive, CPU 10 displays on display unit 15 that the bottoming has taken place (Step Sb11), and ends the process. In a case in which a result of the determination of Step Sb7 is negative, CPU 10 displays the measured body weight on display unit 15 based on the weight information stored in RAM 202 (Step Sb9), and ends the process.

According to the present embodiment, because it is possible to distinguish an error state due to bottoming from an error state due to a reason other than bottoming from among error states that could cause instability in measured values, the occurrence of an error due to bottoming can be reliably detected, and a user can be notified of the error due to bottoming. As a result, a user need only move the body weighing machine to another installation place that is suitable for measurement in order to easily overcome the cause of the error.

Furthermore, when the measured values are not stable and when the measured distance Dm is not zero, it is determined that it is an error state caused for a reason other than bottoming, and the occurrence of this error state is immediately notified to a user. Therefore, even in a case in which an error not due to bottoming has taken place, the occurrence thereof can be detected rapidly and can be notified to a user.

Other Modifications

In the above embodiments and modifications, an error code (for example, "E3") indicating an error was displayed on display unit 15 to notify a user of the occurrence of bottoming, but this is not limited thereto. For example, the type of error may be specified by displaying "Bottoming" or alternatively, by displaying a guidance message such as "A measurement error has occurred. Please move the body weighing machine to a different place and take the measurement again." Furthermore, an error does not have to be indicated by display unit 15. Specifically, by providing a light such as an LED (Light Emitting Diode) (not shown), the light may be turned on when an error occurs. Furthermore, by providing a sound emitter (not shown) with the body weighing machine, a beep or a message indicating that an error has occurred can be output as audio. Furthermore, a body weighing machine may be provided with an output interface for outputting, to an external device, error information indicating the occurrence of an error. This output interface can be a connection terminal for connecting the body weighing machine to an external device or a means for transmitting the error information to an external device via a wireless communication means such as by infrared communication.

Furthermore, in the above embodiment, base plate unit 50 has a quadrangular shape, but this is not so limited. For example, base plate unit 50 may be of a circular form. Furthermore, in the above embodiment, description was given of a case in which the shape of leg portion 60 is cylindrical, but the present invention is not limited thereto. For example, a pair of flat, elongated leg portions may be provided. Accordingly, the number of leg portions 60 is not limited to four, and the number can be freely selected. As described above, a supporting point is a center at which each leg portion supports the base plate unit. Therefore, a supporting point is not limited to the above-described embodiment, and the number and the position of a supporting point depend on the shape and the number of leg portions.

Additionally, in the first to third embodiments and in modifications, description was given of a digital body weighing machine that has a function of detecting bottoming; however, the present invention may also be an analog body weighing machine in which body weight is indicated on a scale. Furthermore, the present invention is not limited to a body weighing machine, and the bottoming detection function of the present invention may be provided to various types of weighing scales such as cooking scales and commercial scales such as those used by cashiers.

What is claimed is:

1. A weighing scale comprising:
   a base plate unit; and
   plural leg portions for supporting the base plate unit, wherein the base plate unit has:
   a weight measurer that measures the weight for the amount of load and generates weight information;
   a detector that detects whether a minimum distance between the base plate unit and a floor surface is zero when the load is applied; and
   a generator that generates error information indicating the occurrence of an error state in a case in which it is detected that the minimum distance is zero by the detector, the error state indicating that accurate measurement of weight is impossible.

2. A weighing scale according to claim 1, further comprising:
   a notifier that notifies a user of the occurrence of the error state based on the error information generated by the generator, the notifier being provided with the base plate unit.

3. A weighing scale according to claim 2,
   wherein the notifier includes a display unit and displays, on the display unit, the occurrence of the error state based on the error information.

4. A weighing scale according to claim 1, further comprising:
   an output interface that outputs the error information to an external device.

5. A weighing scale according to claim 1,
   wherein the detector performs the detection based on the minimum distance corresponding to a distance between a central position of plural supporting points and the floor surface, with each supporting point being a center of each of the plural leg portions at which each leg portion supports the base plate unit.

6. A weighing scale according to claim 1,
   wherein the underside portion of the base plate unit has at least one concave portion that sags in the reverse direction of the floor surface and a plane portion being a portion excluding the at least one concave portion,
   wherein the detector performs the detection based on the minimum distance corresponding to a distance between a position of the plane portion and the floor surface, the position being the closest to a central position of plural supporting points, with each supporting point being a center of each of the plural leg portions at which each leg portion supports the base plate unit.

7. A weighing scale according to claim 1,
   wherein the underside portion of the base plate unit has at least one convex portion that projects toward the floor surface,
   wherein the detector performs the detection based on the minimum distance corresponding to a distance between a position of the convex portion and the floor surface, with the position being that which is the most projecting toward the floor surface.

8. A weighing scale according to claim 1,
   wherein the detector has plural distance measuring sensors for measuring a distance between each sensor and the floor surface, with each of the plural distance measuring sensors being mounted at plural positions of the base plate unit; and
   wherein the detector detects that the minimum distance is zero in a case in which the minimum distance obtained based on one of the values output from the plural distance measuring sensors indicates that the distance between the base plate unit and the floor surface is zero.

9. A weighing scale according to claim 1,
   wherein the detector has plural switches, each of which changes to one of an on state and an off state when the distance between the base plate unit and the floor surface has changed to zero, with each of plural switches being mounted at plural positions of the base plate unit; and
   wherein the detector detects that the minimum distance is zero in a case in which at least one of the plural switches changes to one of the states.

10. A method for controlling a weighing scale having a base plate unit and plural leg portions for supporting the base plate unit, with the base plate unit being provided with a display unit for displaying information, a weight measurer for measuring the weight for the amount of load and generating weight information, and a distance measuring sensor for, when the load is applied, measuring a distance between the sensor and a floor surface,
    the method comprising:
    causing the distance measuring sensor and the weight measurer to operate in parallel; and
    detecting whether a minimum distance between the base plate unit and the floor surface has changed to zero when the measurement by the distance measuring sensor is finished, to display on the display unit the occurrence of an error state in a case in which the minimum distance between the base plate unit and the floor surface is zero and to otherwise display the weight information on the display unit, the error state indicating that accurate measurement of weight is impossible due to bottoming.

11. A method for controlling a weighing scale having a base plate unit and plural leg portions for supporting the base plate unit, with the base plate unit being provided with a display unit for displaying information, a weight measurer for measuring the weight for the amount of load and generating weight information, and a detector for detecting whether a minimum distance between the base plate unit and a floor surface has changed to zero,
    the method comprising:
    determining whether the measured weight is stable based on the weight information; and
    causing the detector to operate in a case in which the measured weight is stable, and displaying on the display unit the occurrence of a first error state in a case in which it is detected by the detector that the minimum distance between the base plate unit and the floor surface is zero, and otherwise displaying the weight information on the display unit, the first error state indicating that accurate measurement of weight is impossible due to bottoming, and causing the detector to operate in a case in which the measured weight is not stable, and displaying on the display unit that an occurrence of the first error state in a case in which it is detected by the detector that the minimum distance between the base plate unit and the floor surface is zero and otherwise displaying on the display unit an occurrence of a second error state, with the second error state indicating that accurate measurement of weight is impossible due to a reason other than bottoming.

* * * * *